(No Model.)
W. C. CAHALL.
GALVANIC BATTERY
No. 489,522.    Patented Jan. 10, 1893.
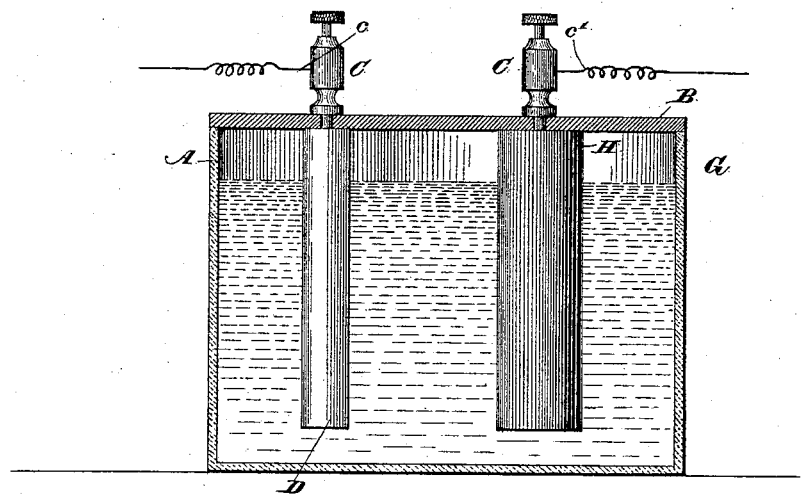
Witnesses
M. E. Fowler
D. P. Northampton
Inventor
William C. Cahall
By his Attorneys,
C. A. Snow & Co.

UNITED STATES PATENT OFFICE.

WILLIAM C. CAHALL, OF PHILADELPHIA, PENNSYLVANIA.

GALVANIC BATTERY.

SPECIFICATION forming part of Letters Patent No. 489,522, dated January 10, 1893.

Application filed September 29, 1891. Serial No. 407,148. (No model.)

*To all whom it may concern:*

Be it known that I, WILLIAM C. CAHALL, a citizen of the United States, residing at Philadelphia, in the county of Philadelphia and State of Pennsylvania, have invented a new and useful Galvanic Battery, of which the following is a specification.

My invention relates to galvanic batteries; and it has for its object to provide an improved negative element for such batteries which would possess nearly as high an electro motive force as carbon and which will in itself be a perfect depolarizer, upon which the hydrogen liberated during the chemical reactions does not cling in bubbles as upon other metals which are commonly employed as the negative elements of galvanic batteries, and an element which does not become clogged or foul with salts as does carbon and similar negative elements and therefore is much more lasting and durable.

With these and other objects in view the invention consists of the combination of oxide of antimony and carbon as the negative element of the battery.

In the accompanying drawing;—the figure is a vertical sectional view of an ordinary cell having therein a negative pole or element as contemplated by this invention.

In the battery G illustrated in the drawing, the negative plate H therein is composed of the oxide of antimony pressed with carbon, [which with the zinc forms a superior couplet of metals to zinc-carbon in a battery,] the same being designed to be used in a solution of chloride of ammonia as in the Leclanché cell and has the advantages over the said cell, in the fact that the negative element, composed of an oxide of antimony and carbon, may be restored when exhausted, by strong heat in the air or by dipping in strong nitric acid.

The element herein described is not necessarily employed only in a battery of the form illustrated in the figure, but may also be used with any construction of galvanic battery to secure the result aimed for, as will be at once apparent to those skilled in the art.

Having thus described my invention, what I claim and desire to secure by Letters Patent is;—

As a negative element in galvanic batteries, the plate composed of the oxide of antimony intimately combined with carbon, substantially as set forth.

In testimony that I claim the foregoing as my own I have hereto affixed my signature in the presence of two witnesses.

WILLIAM C. CAHALL.

Witnesses:
HARRY M. SORBER,
C. S. SORBER.